United States Patent [19]

Ohki et al.

[11] Patent Number: 5,444,689
[45] Date of Patent: Aug. 22, 1995

[54] DETECTION OF PHASE AND AMPLITUDE MODULATION INFORMATION ON OPTICAL MEDIUM WITH A WAVEGUIDE

[75] Inventors: Hiroshi Ohki; Rieko Arimoto; Yutaka Iwasaki; Jun Iwasaki, all of Yokohama, Japan

[73] Assignee: Nikon Corporation, Tokyo, Japan

[21] Appl. No.: 109,904

[22] Filed: Aug. 23, 1993

[30] Foreign Application Priority Data

Aug. 28, 1992 [JP] Japan .................... 4-229001
Sep. 11, 1992 [JP] Japan .................... 4-242487

[51] Int. Cl.$^6$ .................... G11B 7/00; G02B 6/10
[52] U.S. Cl. .................... 369/109; 369/100; 369/275.1; 369/275.4; 369/112; 369/120
[58] Field of Search ............ 369/103, 109, 112, 275.3, 369/275.4, 100, 275.1, 120

[56] References Cited

U.S. PATENT DOCUMENTS 5,218,594  6/1993  Tanno .................... 369/100
5,249,175  9/1993  Akahira et al. .................... 369/275.1

OTHER PUBLICATIONS

Braat, "Optics of Recording and Read-Out in Optical Disk Systems," *Japanese Journal of Applied Physics*, vol. 28 (1989) Supplemental 28-3, pp. 103-108.

Nagashima et al, "V-Grooved Optical Disc Applied to HDTV Signal Recording," *SPIE*, vol. 1656, High--Resolution Systems (1992), pp. 231-241.

Kayanuma et al, "High Track Density Magneto-Optical Recording Using a Crosstalk Canceler," *SPIE*, vol. 1316 Optical Data Storage (1990), pp. 35-39.

Aratani et al, "Magnetically Induced Super Resolution In Novel Magneto-Optical Disk," *SPIE*, vol. 1499 Optical Storage '91, pp. 209-215.

Hiroshi Ooki et al; Optics Communications, "A Novel Type of Laser Scanning Microscope: Theoretical Considerations", 1991, pp. 177-182.

J. Iwasaki, et al. OITDA Second International Forum, "New Trends on Scanning Optical Microscopy", Jan. 1992.

*Primary Examiner*—Georgia Y. Epps
*Assistant Examiner*—Kim-Kwok Chu
*Attorney, Agent, or Firm*—Shapiro and Shapiro

[57] ABSTRACT

An optical recording medium includes a substrate, first information for modulating a phase of read light radiated on the substrate, and second information for modulating an amplitude of the read light radiated on the substrate. The first information and the second information are arranged in parallel to each other on the substrate in a predetermined arrangement direction. A method and apparatus for performing reproduction using this medium are also disclosed. The method includes the step of radiating read light on the optical recording medium in which the first information for modulating the phase of the read light and the second information for modulating the amplitude of the read light are recorded, the step of receiving light through the optical recording medium, the detection step of independently detecting phase modulation information and amplitude modulation information of the optical recording medium using the received light, and the step of reproducing the first information and the second information from the information in the detection step.

20 Claims, 8 Drawing Sheets

DETECTION OF PHASE AND AMPLITUDE MODULATION INFORMATION ON OPTICAL MEDIUM WITH A WAVEGUIDE

BACKGROUND OF THE INVENTION

1. Field of the Invention

The present invention relates to an optical recording medium (e.g., an optical disk), and a reproducing method and apparatus using the same.

2. Related Background Art

Along with the progress in an information-oriented society, an amount of information is kept on increasing. Strong demand has arisen for a large-capacity information recording medium. Of all conventional optical recording/reproducing schemes, an optical recording-/reproducing scheme for recording/reproducing information using light (light spot) capable of being focused within a very small area (e.g., an area having a diameter of about 1 μm) is most popular because the information recording density can be much higher than a conventional magnetic recording/reproducing scheme. In a state-of-the-art optical recording/reproducing scheme, information is recorded on an optical recording medium as a change in physical quantity such as a change in crystalline state or maximum absorption. This change is read as a change in polarization plane or amplitude (intensity) as a physical quantity of light.

In the conventional optical recording/reproducing method, physical changes caused in a medium as information for the area of a light spot are of one kind, or even if they are of plural kinds read light is extracted as a change in only one of the physical quantities of light. For this reason, the minimum unit in information recording is one quantity per area of one light spot. So, the information recording density is limited to the magnitude of a light spot, which is of a size larger than a diffraction limit determined by a wavelength and the numerical aperture of a condenser lens. As a result, the information recording density cannot be higher than the diffraction limit.

As recent techniques for increasing the recording density, a confocal structure (ex. J. Broat, Jpn. Apl. Phys. Suppl. 28-3 (1989) 103), a V-groove optical disk (ex. M. Nagashima et. al., Proc. SPIE, 1656 (1992) 20), an MSR (K. Aratani et. al., Proc. SPIE, 1499 (1991) 209), a crosstalk canceler (ex. K. Kayanuma et. al., Proc. SPIE, 1316 (1990) 35), and the like have been proposed. Of these conventional techniques, the confocal structure is not practical because an amount of detection light must be sacrificed to sufficiently increase the resolution. The V-groove disk has a high manufacturing cost, and the recording scheme of MSR is limited to the magnetooptical recording only. The crosstalk canceler requires three beams in signal reproduction, and its optical system is complicated.

SUMMARY OF THE INVENTION

It is the first object of the present invention to provide an optical recording/reproducing method and apparatus, wherein a recording density can be increased to twice or more although a simple optical system can be used and the manufacture of a recording medium can be facilitated.

It is the second object of the present invention to greatly increase the information recording density of an optical recording medium.

In a medium of the present invention, information is recorded as changes in phase and amplitude independent each other. In a conventional medium, information (binary information) is expressed as the presence/absence of a bit (unit of information), its position, its count, its length, or a combination thereof. In other words, in the conventional medium, information may be regarded to be expressed as the presence/absence of a bit interval, its position, its count, its length, or a combination thereof.

The bit is called a pit in the past and is called a mark at present. Bits are formed along each track in a discrete manner. The medium of the present invention has at least two kinds of bits, i.e., a bit for providing a first phase A and a first amplitude B and a bit for providing the first phase A and a second amplitude b with respect to read light. Similarly, the medium of the present invention has two kinds of bit intervals, i.e., a bit interval for providing a second phase a and the first amplitude B and a bit interval for providing the second phase a and the second amplitude b with respect to the read light. In the medium of the present invention, light components reflected by or transmitted through the medium can be classified into at least four kinds i.e., AB, Ab, aB, and ab. The medium of the present invention is called a medium subjected to at least four-value recording. The medium of the present invention has a recording density twice that of a conventional CD (Compact Disk), which is subjected to binary recording. When at least two kinds of bits and at least two kinds of bit intervals, all of which have different combinations of phases and amplitudes, are used, multi-value recording using four or more values can be realized. In this case, the recording density can be further increased. In some cases, the medium of the present invention may include a medium having first and second overlapping tracks adjacent in the incident direction of read light, wherein phase modulation information (phase bit) is recorded in the first track, and amplitude modulation information (amplitude bit) is recorded in the second track. In this case, since the first and second tracks are adjacent in the incident direction of read light, "read light radiated on the medium and reflected by or transmitted through the medium" contains both phase information and amplitude information. That is, the read light is modulated with both a phase and an amplitude.

To differentiate a bit phase from a bit interval phase, the optical path length (i.e., refractive index $n \times$ mechanical distance d) is changed. For this purpose, the bit (or pit) can be constituted by a recess (dimple or blind hole), a projection (island-like protrusion), a through hole, or a material having different refractive index from that of a substrate. To change the amplitudes of the bit and bit interval, a reflectance or transmittance can be changed. For this purpose, a reflecting layer may be formed in a bottom portion or upper surface of the bit or bit interval. Alternatively, the bit and bit interval may be formed using different materials having different reflectances or transmittances each other.

The size of a minimum bit is preferably minimized to increase the recording density. It is, however, difficult to form a very small bit. The size of the minimum bit Generally falls within the range of 0.01 to 2 μm, and preferably 0.1 to 1 μm.

Tracks are classified into explicit and implicit tracks. The explicit track is a track constituted by a Groove between land portions. A step between the Groove and the land portion serves as a tracking Guide. The latter track is represented by a bit array serving as a tracking Guide. The tracks are formed as concentric or spiral tracks in a disk. If a card-like medium is used, tracks are linear.

When read light (light spot) is moved (scanned or tracked) relative to a medium along a track, the read light reflected by or transmitted through the medium is subjected to changes (i.e. modulation) in phase and amplitude due to the presence of bits.

According to the present invention, information is reproduced while the two different physical quantities (phase and amplitude) are kept separated. A reproducing apparatus according to the present invention comprises a photodetecting means for reproducing information from modulated read light while detecting the phase and amplitude independently each other. In this case, the phases and amplitudes of one bit or one bit interval may be simultaneously detected. In some cases, the phase may be detected in the first half of the detection period, and the amplitude may be detected in the second half. Light (modulated read light) reflected by or transmitted through the medium may be split into two components, and the phase may be detected using one of the two components, and the amplitude may be detected using the other of the two components.

Read light having a short wavelength may be Used because an increase in recording density according to the present invention does not depend on the wavelength of a light source. In this case, the recording density can be increased to twice that of the state-of-the-art CD.

A means for modulating the phase of read light may be projection or recessed bits formed on the surface (first track) of a flat transparent medium substrate (recording medium) in accordance with information (binary information of four-value information) to be recorded. In this case, the reflectance of the bottom surface of the bit can be easily set equal to that of the upper surface of the medium so as not to modulate the amplitude of the read light.

As a means for modulating the amplitude of read light, a material having a reflectance different from those of a substrate and air is deposited on the lower surface (second track) of the substrate in accordance with information (remaining binary information of four-value information), thereby modulating the amplitude. In this case, it is easily smoothed the lower surface of the substrate so as not to modulate the phase of the read light.

These two means can be implemented independently of each other at the same position of one recording medium. More specifically, a concave (recession) or convex (projection), that is bit or pit is formed on the upper surface (first track) of the transparent substrate to modulate the phase of read light, and bits consisting of the material having a reflectance different from those of the substrate and air and deposited on the lower surface (second track) are used to modulate the amplitude of the read light. In this case, the thickness of the transparent substrate is set not to greatly cause a defocus (to form a smallest light spot having a minimum irradiation region, which can increase the recording density, light from a light source is focused on a medium surface by a focusing means such as an objective lens. To obtain a minimum light spot, the medium must be located at the focal position of the objective lens. When the medium is located at this focal position, an in-focus state is obtained. Otherwise, a defocus state is caused.) state of the read light focused on the upper and lower surfaces of the substrate. Therefore, to read both phase modulation information and amplitude modulation information, the focusing state of the read light need not be changed to read both the phase modulation information and the amplitude modulation information.

A means for modulating the amplitude of read light is constituted by a bit having a refractive index different from that of a bit interval on the surface of the recording medium in accordance with the binary information, thereby obtaining the bit having a surface reflectance different from that of the recording medium. This bit may be used to modulate the amplitude of the read light.

The recessed or projecting bit is formed on the upper or lower surface of the medium substrate in accordance with information to be recorded, as described above, to record the phase modulation information and the amplitude modulation information in a superposed manner. In this case, a phase modulation signal (phase modulation information) and an amplitude modulation signal (amplitude modulation information) are superposed on each other on the same surface (at the same position) of one recording medium.

According to the present invention, the phase and amplitude modulation signals are separately and independently read from the above-mentioned recording medium in which these signals are superposed on each other.

The amplitude modulation signal of the phase and amplitude modulation signals can be read (reproduced) by causing a photodetection element (a kind of photodetector) such as a photodiode to detect an amount of light reflected by the recording medium as in the conventional case. In this case, only the amplitude modulation signal can be separately read because the photodetector does not a change in phase.

The phase modulation signal can be reproduced as an intensity signal (differential signal) by a photodetecting means for detecting the modulated read light, such as a waveguide device comprising: a substrate having (i) a double mode waveguide for causing mode interference between an even mode and an odd mode, (ii) a waveguide dividing region for dividing the double mode waveguide into two channel waveguides, and (iii) the two divided channel waveguides; and a waveguide device having two photodetectors respectively arranged at the terminal ends of the two channel waveguides.

In the waveguide device having this double mode region, when the length of the double mode region is appropriately selected, the differential signals of (i) a phase distribution and (ii) an amplitude distribution of light incident on the double mode region can be independently and separately detected as a difference signal of outputs from the two photodetectors.

The mode interference in the waveguide used in the present invention is given as disclosed in a waveguide type differential interference contrast microscope proposed in co-assigned U.S. Ser. No. 801,413. More specifically, when a laser spot reflected by an object is incident on a double mode waveguide, mode interference occurs in the waveguide, and an asymmetrical distribution of the light intensity in the waveguide, which reflects a small phase or reflectance gradient of the object, is obtained. Assume that the length of the double mode waveguide is appropriately selected, that the intensities of light components included in the left and right portions of the double mode waveguide are detected by a Y-shaped portion, and that a difference between the detected light intensities is obtained. Under these assumptions, differential information of the object can be obtained. If the perfect coupling length (i.e., a length which provides a phase difference of 180° between the even and odd modes) of the two modes in the double mode waveguide is defined as $L_c$, an optimal length L of the double mode waveguide can be defined as follows with respect to the phase object:

$$L=(m+\tfrac{1}{2})L_c$$

On the other hand, the optical length L is defined with respect to the amplitude object as follows:

$$L=mL_c$$

where m is an integer.

As a most practical reproducing method according to the present invention, there is provided an optical recording/reproducing apparatus, for recording binary information as a pit projecting or recessed with respect to a reference surface of a recording medium, scanning the information with a laser spot, and detecting modulation of reflected light, thereby reproducing information, wherein two depths or two heights of pits are defined with respect to the reference surface, and pit arrays at the two depths or two heights are aligned.

As a most practical optical recording/reproducing apparatus, there is provided an optical recording/reproducing apparatus including a recording medium in which binary information is recorded as a projecting or recessed pit on a recording medium surface, light radiation means for relatively scanning the binary information recorded on the recording medium with a laser spot, and modulation detection means for detecting modulation of light reflected by the recording medium, wherein two depths or two heights of the pits are defined with respect to the reference surface, and pit arrays at the two depths or two heights are aligned.

The projecting or recessed pit having one of the two depths or heights with respect to the reference surface is set to $\lambda/8$ as the length of an optical length, and the projecting or recessed pit having the other of the two depths or heights is set to $\lambda/4$ as the length of the optical length. The pitch having a depth or height corresponding to $\lambda/4$ with respect to the reference surface preferably has a width which is $\tfrac{1}{3}$ or less the focused spot size ($e^{-2}$ full width) of the read laser beam. However, the application range of the present invention is not necessarily limited to this condition.

It is practical to arrange the modulation detection means by a channel waveguide device and a photodetector for detecting light passing through the waveguide device. More specifically, the waveguide device comprises an incident-side double mode linear waveguide portion, two exit-side linear waveguide portions, and a Y-shaped portion for coupling these linear waveguide portions. The incident end of the waveguide channel device is located at a focusing position where light reflected by the recording medium is focused again. The photodetector detects light emerging from the two linear waveguide portions through the Y-shaped portion. The photodetector of the modulation detection means outputs signals obtained by photoelectrically converting exit light components from the two linear waveguide portions. In detection of a pit having a depth or height corresponding to the length of the optical path as $\lambda/8$ with respect to at least the reference surface, it is practical to provide a differential means for outputting a differential output of the photoelectrically converted signals as an optically recorded/reproduced signal.

The waveguide substrate of the waveguide device preferably has an electrooptical effect and an electrode structure in the double mode linear waveguide portion. The waveguide device preferably has a control means for controlling a voltage applied to each electrode of the electrode structure. The waveguide device can preferably control the voltage applied to each electrode to change equivalent refractive indices in the two waveguide modes excited in the double mode linear waveguide portion.

The waveguide device preferably further comprises a third linear waveguide portion between the two exit-side linear waveguide portions. The third linear waveguide portion, the remaining two linear waveguide portions, and the double mode linear waveguide portion are coupled by the connecting portion of the waveguide portions. A recording medium radiation laser beam can be input from the end face of the third waveguide portion and can emerge from the end face of the double mode linear waveguide portion.

In the optical recording/reproducing apparatus according to the present invention, the recording medium is a disk, and the projecting or recessed pits having two depths or two heights with respect to the reference surface are practically arranged every other track.

According to the present invention, a pit having a small step having a depth (or height) corresponding to the optical path length of $\lambda/8$ and a pit having a large step having a depth (or height) corresponding to the optical path length of $\lambda/4$ are used. The read principle of the former pit is identical to observation of a phase object in the waveguide type differential interference contrast microscope. In this case, the length of the double mode waveguide is defined as $L=(m+\tfrac{1}{2})L_c$. In the latter pit, i.e., when the step is almost equal to $\lambda/4$, a laser spot formed on the pit is subjected to a phase change of $\pi$, i.e., $\lambda/2$ which is the length the laser beam travels when it goes to and returns from the pit. Therefore, a complex amplitude distribution $o(x,y)$ on the surface of the disk is defined as follows when the reflectance is given as 100% for descriptive convenience:

$$o(x,y) = \begin{cases} -1 & \text{(within pit)} \\ 1 & \text{(outside pit)} \end{cases} \quad (1)$$

This object can be interpreted as an amplitude modulating object whose amplitude reflection coefficient is changed from 1 to $-1$. In practice, when the pit is expressed by equation (1), it can be proved that the phase difference between the two modes (0th- and 1st-order modes) excited in the double mode waveguide by light reflected by the disk is set to zero or $\pi$. In this case, therefore, it is found that the length of the double mode waveguide is preferably $L=mL_c$.

When the length of the double mode waveguide is given as $L=(m+\tfrac{1}{2})L_c$, the pit having a smaller step can be detected, but the pit having the step of about $\lambda/4$ cannot be detected. A reversed relationship is obtained when $L=mL_c$. This is described in detail in U.S. Ser. No. 801,413 cited above or H. Ooki and J. Iwasaki, Opt. Commun 85 (1991) 177. Pit arrays having different steps can be arranged closely adjacent to each other, and therefore recording information can be recorded at a high density.

If the step is about $\lambda/4$, care must also be taken for the pit width.

Assume that a pit width W is infinite. When the center of the read laser spot reaches the edge position of a pit, a light intensity distribution of the light reflected by the disk on the incident end face of the waveguide device becomes symmetrical (even function) in the longitudinal direction of the pit. This does not depend on the magnitudes of steps. This will be proved below. Assume a one-dimensional model because the pit width is infinite.

A complex amplitude distribution $o(x)$ of the disk is defined as follows:

$$o(x) = \begin{cases} 1 & x \leq 0 \\ e^{i\phi} & x > 0 \end{cases} \quad (2)$$

If the amplitude distribution of the laser spot radiated on the disk is defined as $u(x)$, an amplitude distribution $g(x,x_0)$ of light reflected from the disk at the inlet of the waveguide device is defined as follows:

$$g(x,x_0) = \int u(s-x_0)o(s)k(s-x_0-x)ds \quad (3)$$

where $x_0$ is a distance between the center of the radiated laser spot and the step ($x=0$) and $k(x)$ is the transmission function (dot image amplitude distribution function) of an optical system. When the radiated laser spot is located at the step point, i.e., if $x_0=0$, then the following equation is easily derived from equation (3) together with equation (2) because functions $u(x)$ and $k(x)$ are generally even functions:

$$|g(x,o)|^2 = |g(-x,o)|^2 \quad (4)$$

In this case, a differential output becomes zero. That is, the differential output is a signal having a waveform zero-crossing an edge position. In this case, the differential signal cannot be first-order derivative information of an object, but is close to quadratic differential information. When an electrical signal processing system is changed, recorded information can be read from this differential signal.

When a two-dimensional system is taken into consideration, the following equation is obtained:

$$g(x,y;x_0,y_0) = \int \int_{-\infty}^{\infty} u(s-x_0,t-y_0)o(s,t) \cdot \quad (5)$$

$$k(s-x_0-x,t-y_0-y)dsdt$$

so that coupling coefficients $\eta_0(x_0,y_0)$ and $\eta_1(x_0,y_0)$ of the incident light and the waveguide modes are defined as follows:

$$\eta_0(x_0,y_0) = C \int \int_{-\infty}^{\infty} g(x,y;x_0,y_0)f_0(x,y)dxdy \quad (6)$$

$$\eta_1(x_0,y_0) = C \int \int_{-\infty}^{\infty} g(x,y;x_0,y_0)f_1(x,y)dxdy \quad (7)$$

where C is a constant coefficient, and $f_0(x,y)$ and $f_1(x,y)$ are inherent field distributions of the waveguide modes wherein suffixes 0 and 1 represent the 0th and 1st orders. A light intensity distribution $I(x,y;x_0,y_0)$ in the waveguide is defined as follows:

$$I(x,y;x_0,y_0) = |\eta_0(x_0,y_0)f_0(x,y) + e^{i\theta}\eta_1(x_0,y_0)f_1(x,y)|^2 \quad (8)$$

where $\Theta$ is the phase difference between the 0th- and 1st-order modes defined by the length L of the double mode waveguide and the perfect coupling length $L_c$ as follows:

$$\theta = L\pi/L_c \quad (9)$$

A differential output $s(x_0,y_0)$ is defined below:

$$s(x_0,y_0) = \int_0^{-B} dy \int_0^{-A/2} I(x,y;x_0,y_0)dx - \int_{-B}^{0} dy \int_0^{A/2} I(x,y;x_0,y_0)dx \quad (10)$$

where A is the waveguide width and B is the depth. In this case, $o(x,y)$ represents the spatial distribution of the pits, and the differential output s cannot be zero at a stepped point when the pit width W is reduced. This can be intuitively understood from FIG. 6. More specifically, if W is finite, the amplitude distribution $g(x)$ of return light is given by an integral (equation (5)) of the interiors of two circles (representing a range in which $u(x,y)$ and $k(x,y)$ have significant values in FIG. 6 and having a dimension of about a spot size). The integral is apparently divided into $|y|<W/2$ and $|y|>W/2$ portions. The integral value for $|y|<W/2$ is almost equal to the value for the pit width of $\infty$ (infinite). However, the arrangement in FIG. 5 also has the contribution from the $|y|>W/2$ portion, which does not include step information. A total amplitude distribution obtained by the amplitude distribution given by a real function caused by the contribution from the $|y|>W/2$ portion and the amplitude distribution function having a phase gradient (although the intensity distribution is symmetrical) caused by the contribution from the $|y|<W/2$ can be easily speculated such that its intensity distribution is no longer an even function. According to this concept, if the pit width W is set about $\frac{1}{3}$ or less the spot size ($e^{-2}$ full width), the differential output s at $L=mL_c$ corresponds to the first-order derivative signal of the pit having the step difference of $\lambda/4$.

The above discussion is based on an operation for read-accessing the pit having the step difference of $\lambda/4$ using the differential output. However, this pit can also be read-accessed using a sum output. In detection using the sum output, a mode interference effect does not directly appear, and detection is similar to conventional disk reproduction. However, this detection is performed through the channel waveguides, a confocal structure using a waveguide element is obtained and can increase the resolution, as a matter of course. In detection using the sum output, the pit width W need not be reduced, and the length L of the double mode region need not be set to a specific value. In this case, crosstalk from adjacent pit arrays cannot be suppressed in principle. Modulation of the sum signal caused by the crosstalk is, however, small because the adjacent pit arrays have a small step difference. Therefore, the crosstalk from the adjacent tracks in detection of the pit having the step difference of $\lambda/4$ can be minimized.

In the above discussion, the step differences of the pits are a step difference of $\lambda/8$ or less ($<\lambda/8$) and a step difference of about $\lambda/4$ ($\approx\lambda/4$). However, the step differences need not be limited to these. When two types of pits having step differences are aligned parallel to each other and one of the two types of pits is read-accessed in accordance with a differential output, the length L of the double mode waveguide region which minimizes a crosstalk signal from the adjacent pit array is always-present. At this time, the length L is not limited to $mL_c$ or $(m+\frac{1}{2})L_c$, or may not nullify the crosstalk component. However, by setting this length L, the crosstalk from the adjacent pits can be apparently suppressed.

The optical system according to the present invention is used in a TE or TM mode as far as polarized light components are concerned.

DESCRIPTION OF THE PREFERRED EMBODIMENTS

Figure 1:
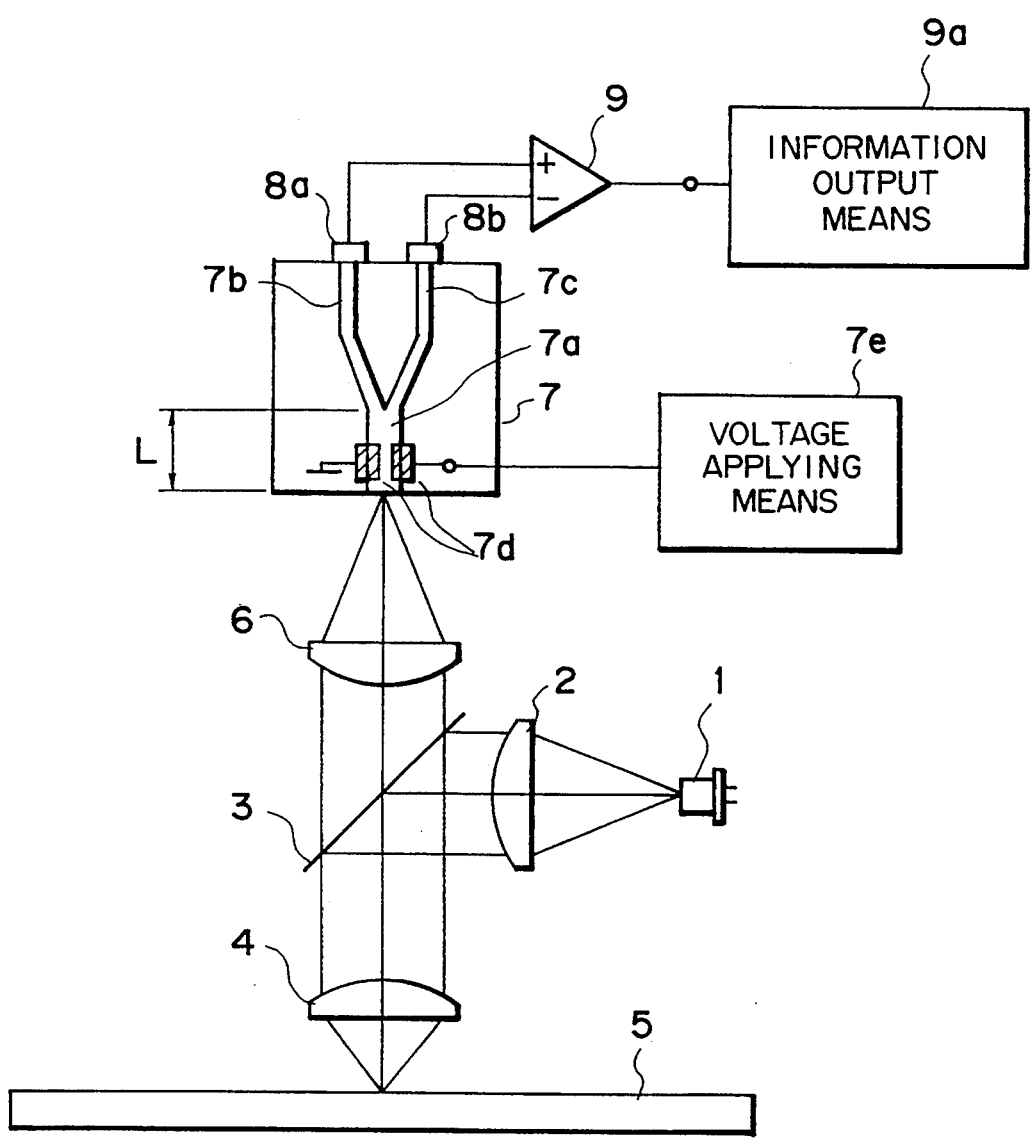
FIG. 1 is a view showing the schematic arrangement of an optical recording/reproducing apparatus according to the first embodiment of the present invention.

FIG. 1 shows an embodiment of the present invention. Light emitted from a laser diode 1 is collimated into a parallel beam by a collimator lens 2. The parallel beam passes through a half mirror 3 and an objective lens 4 and is formed into a spot on an optical disk 5. Light reflected by the disk 5 passes through the objective lens 4 and the half mirror 3 and is formed into a spot on the end face of a waveguide device 7 through a condenser lens 6. The waveguide device 7 comprises a double mode linear waveguide 7a and two linear waveguides 7b and 7c connected to the waveguide 7a through a Y-shaped portion. Photoelectric detectors 8a and 8b are connected to light exit ends of the linear waveguides 7b and 7c, respectively. Output signals from the photoelectric detectors 8a and 8b are subtracted as a differential output through a differential amplifier 9. The differential output derives an optically recorded/reproduced signal. On the basis of this signal, information on the optical disk 5 is displayed by an information output means 9a. Electrodes 7d are arranged on the double mode linear waveguide 7a. A voltage applied across the electrodes 7d is changed by a voltage applying means 7e to obtain an effect substantially equivalent to a change in a length L of the double mode waveguide 7a. The substrate of the waveguide device 7, of course, has an electrooptical effect.

Figure 2:
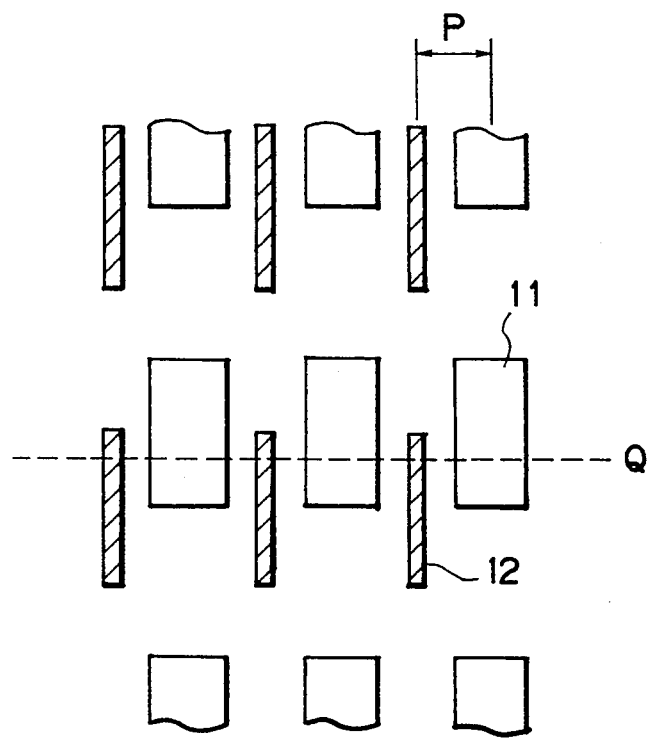
FIG. 2 is a plan view showing the arrangement of projecting and recessed pit arrays on an optical recording medium according to the present invention.
Figure 3:
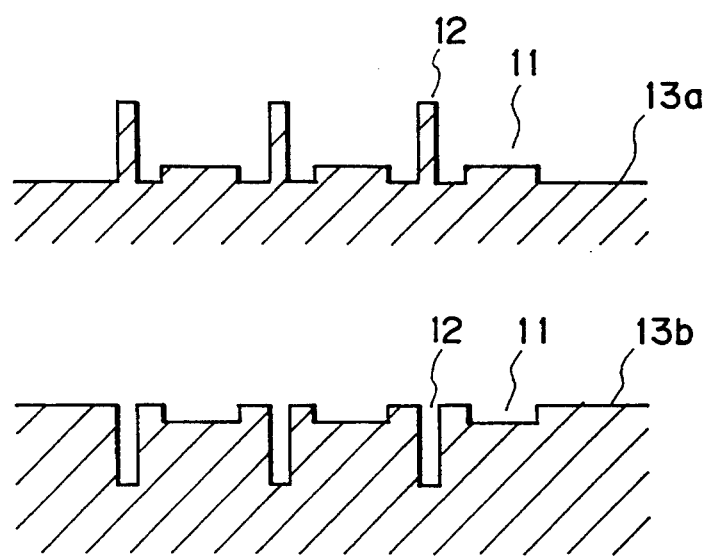
FIG. 3 is a sectional view showing projecting and recessed pit arrays on an optical recording medium according to the present invention.

FIG. 2 is a plan view showing the arrangement of pits according to the present invention. This arrangement has a double spiral structure in which shallow ($<\lambda/8$) pits 11 and deep ($\lambda/4$) pits 12 are alternately arranged. The longitudinal (or vertical) direction in FIG. 2 is the pitch arrangement direction. As described above, each deep pit 11 preferably has a sufficiently small width, as shown in FIG. 2, depending on a reproduction method. The sectional views in FIG. 3 represent cross-sectional shapes along a dotted line Q in the plan view representing the arrangement of the projecting and recessed pit arrays shown in FIG. 2. The upper sectional view in FIG. 3 represents a case in which the pits 11 and 12 have different heights with respect to a reference surface 13a. The lower sectional view in FIG. 3 represents a case in which the pits 11 and 12 have different depths.

In reproduction of the pit 11, a voltage applied across the electrodes 7d is set in such a way as $L=(m+\frac{1}{2})L_c$. In reproduction of the pit 12, the voltage is set in such a way as $L=mL_c$. When the voltage is set as above, during reproduction of the pit 11, the pit 12 is not detected, and during reproduction of the pit 12, the pit 11 is not detected. Therefore, a track pitch P can be reduced to about $\frac{1}{2}$ the conventional track pitch.

Figure 4:
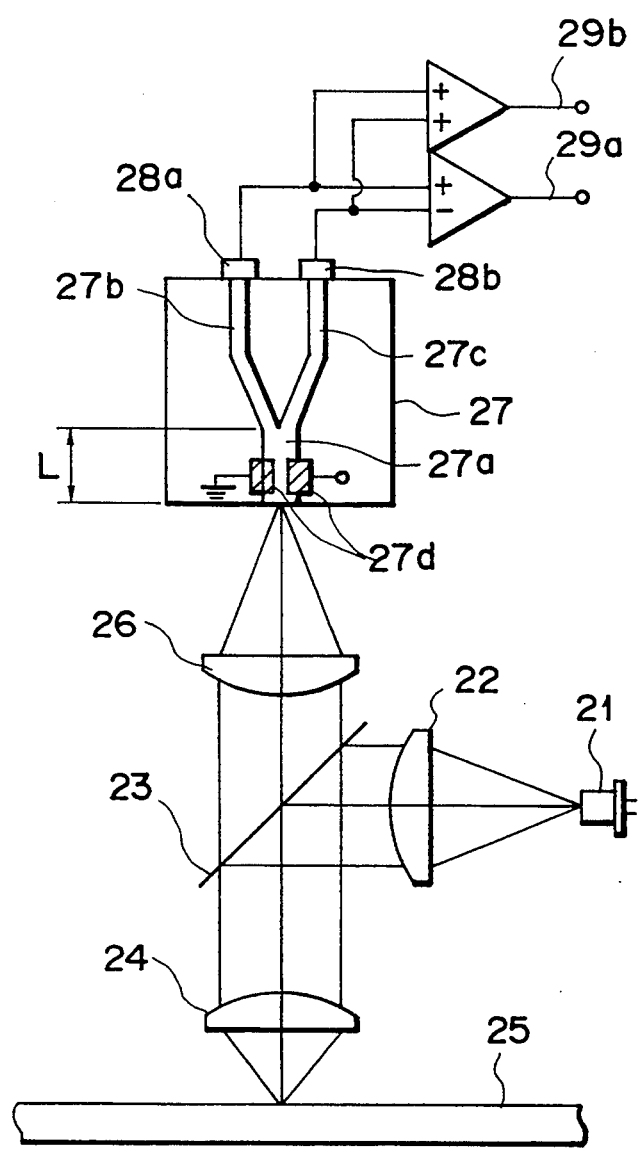
FIG. 4 is a view showing the schematic arrangement of an optical recording/reproducing apparatus according to the second embodiment of the present invention.

FIG. 4 shows the schematic arrangement of the second embodiment of the present invention. The basic arrangement of this embodiment is the same as that of the first embodiment shown in FIG. 1. However, a voltage applied to electrodes 27d arranged in a double mode waveguide region is fixed such that a length L of the double mode waveguide is always $L=(M+\frac{1}{2})L_c$. If this condition is satisfied, the electrodes 27d can be omitted. In this case, outputs from two detectors 28a and 28b are formed into a difference output 29a to reproduce the shallow pit ($<\lambda/8$) and a sum output 29b to reproduce the deep pit ($\lambda/4$). The difference or differential output 29a corresponds to a differential signal of the pit, and the sum output 29b is not a differential signal. Electrical signal processing systems (not shown in FIG. 4) for producing the difference and sum outputs 29a and 29b are slightly different from each other.

In the above description, the pit 11 is defined as a shallow pit ($<\lambda/8$), and the pit 12 is a deep pit ($\lambda/4$) having a small width. However, the depths and width of the pits 11 and 12 are not limited to these. The pits 11 and 12 can be constituted any pits having a step difference. When the height or depth from a reference surface is $\lambda/4$, namely when difference in optical path length the beam travels when it goes to and returns from the pits is $\lambda/2$, the pits provide practically amplitude modulation information.

In reproduction of the pit 11, a voltage applied across the electrodes 27d is regulated by a voltage applying means 7e such that the crosstalk from the pit 12 is minimized. In reproduction of the pit 12, a voltage applied across the electrodes 27d is regulated by the voltage applying means 7e such that the crosstalk from the pit 11 is minimized. When standards of the depths and widths of the pits are predetermined, application of the voltages to the electrodes 27d in correspondence with the actual crosstalk components does not pose any problem on the system configuration, but provides a practical method. In this case, the voltage applied to the electrodes 27d does not always have a value satisfying $L=mL_c$ or $L=(m+\frac{1}{2})L_c$.

Figure 5:
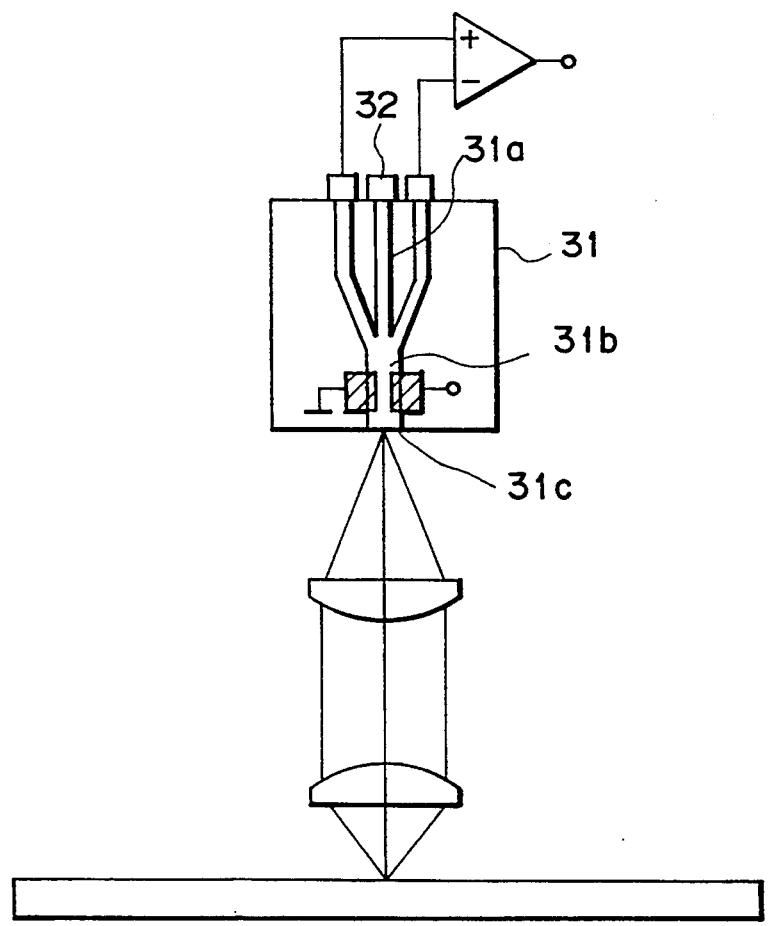
FIG. 5 is a view showing the schematic arrangement of an optical recording/reproducing apparatus according to the third embodiment of the present invention.
Figure 6:
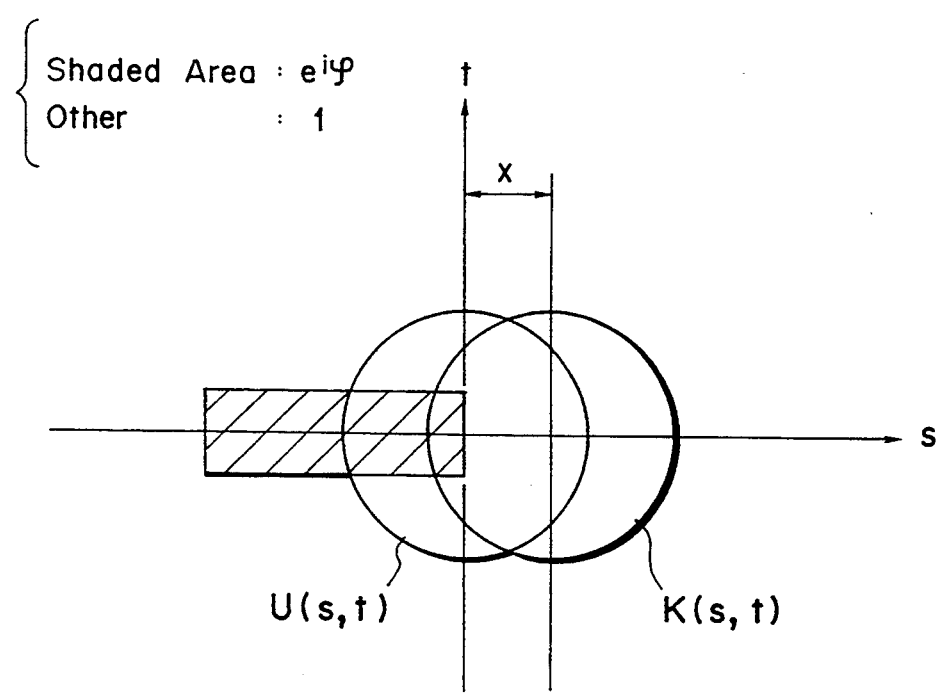
FIG. 6 a view for explaining a relationship between the width of a projecting or recessed pit on the recording medium and a focused light spot according to the present invention.

FIG. 5 shows the third embodiment of the present invention. As can be apparent from FIG. 5, laser diodes 32 are mounted on a waveguide substrate 31. Light beam emitted from the laser diode 32 passes through linear waveguide 31a and through a double mode linear waveguide 31b to emerge from an end face 31c. At this time, the center of the linear waveguide 31a must be aligned with the center of the double mode linear waveguide 31b. This structure can withstand an offset between a light source point and a waveguide incident point which is caused by system vibrations and system deteriorations over time.

Figure 7:
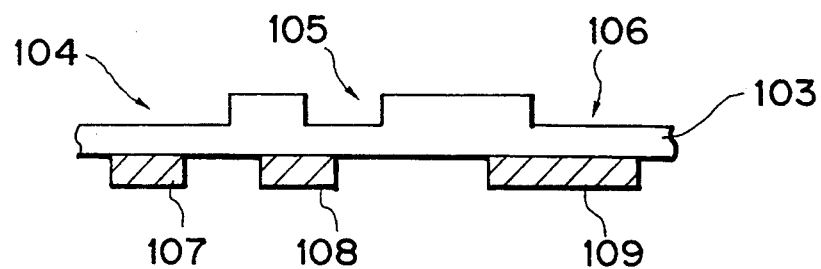
FIG. 7 is a schematic sectional view showing another structure of an optical recording medium according to the present invention.

FIG. 7 is a schematic sectional view of another structure of a recording medium according to the present invention. Binary information 101 represented by 0s and 1s, as indicated in the upper portion in FIG. 7, is recorded as phase modulation information, and binary information 102 represented by 0s and 1s, as indicated in the upper portion in FIG. 7, is recorded as amplitude modulation information. Upper surface portions of a transparent glass substrate 103 which correspond to 0s of the phase modulation information are selectively etched (e.g., photolithographic etching) to form recessed bits 104, 105, and 106. Each recessed bit provides a phase different from that of a bit interval to read light radiated thereon. Aluminum is selectively deposited on lower surface portions of the glass substrate 103 which correspond to 1s of the amplitude modulation information to form reflecting bits 107, 108, and 109. Each reflecting bit provides a reflection amount different from that of a bit interval to a read light radiated thereon.

Figure 8:
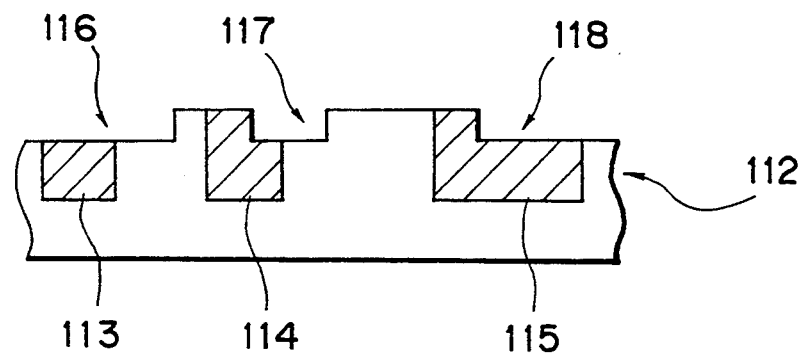
FIG. 8 is a schematic sectional view showing still another structure of an optical recording medium according to the present invention.

FIG. 8 is a schematic sectional view showing still another structure of a recording medium according to the present invention. Binary information 110 represented by 0s and 1s, as indicated in the upper portion in FIG. 8, is recorded as phase modulation information, and binary information 111 represented by 0s and 1s, as indicated in the upper portion in FIG. 8, is recorded as amplitude modulation information. Upper surface portions of a glass substrate 112 which correspond to 1s of the amplitude modulation information 111 are selectively ion-exchanged to increase the reflectance to form reflecting bits 113, 114, and 115. And then, upper surface portions of the glass substrate 112 which correspond to 0s of the phase modulation information 110 are etched to form recessed bits 116, 117, and 118.

Thus an optical recording medium in which the phase modulation information and the amplitude modulation information are recorded while being independently separated and superposed on each other is manufactured.

In the structures in FIGS. 7 and 8, phase modulation information and amplitude modulation information may be perfectly superposed on each other or may be shifted from each other, as shown in FIGS. 7 and 8.

Figure 9:
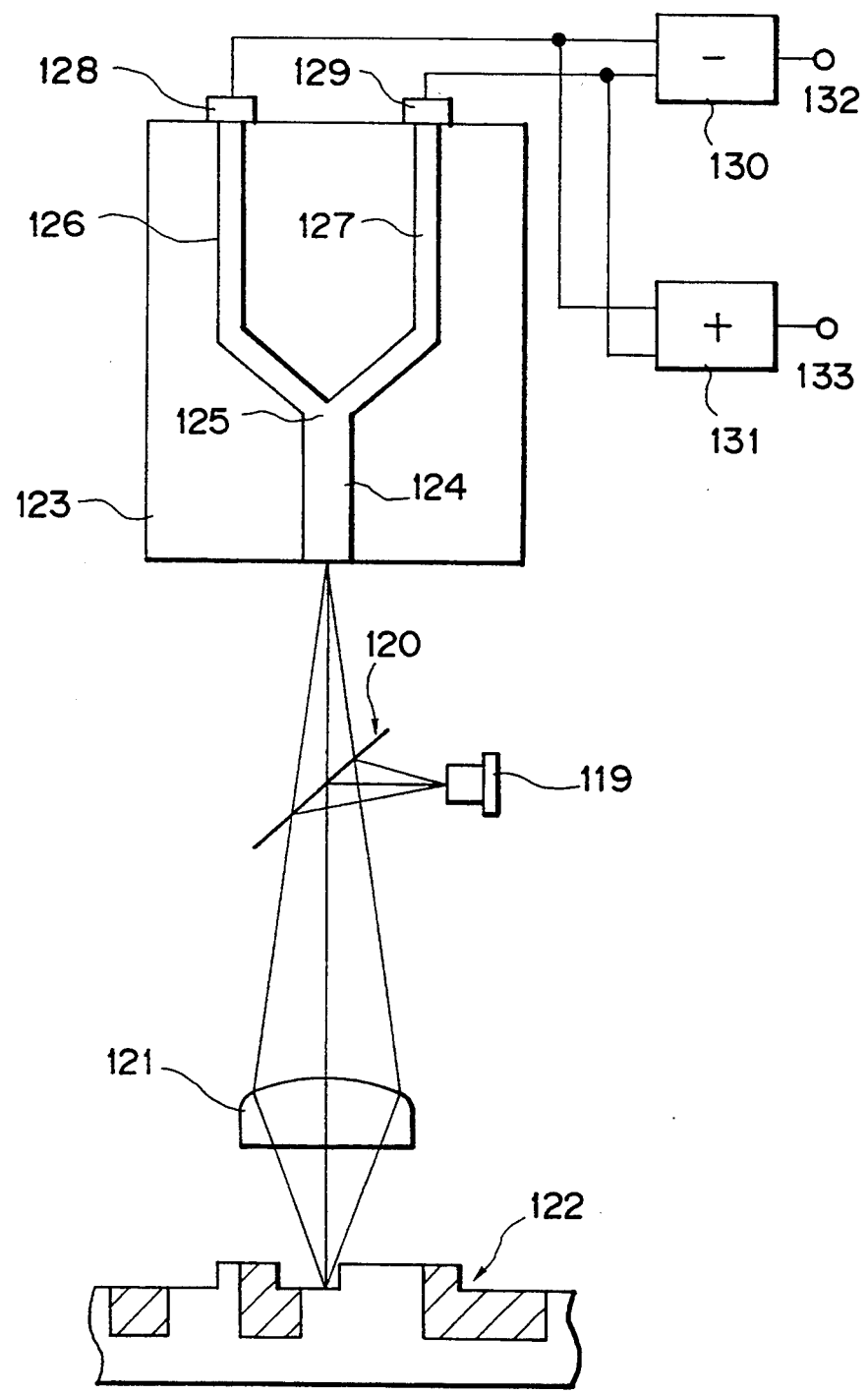
FIG. 9 is a schematic view showing an optical recording/reproducing apparatus according to the fourth embodiment of the present invention.

FIG. 9 is a schematic view showing the arrangement of an optical recording/reproducing apparatus according to the fourth embodiment of the present invention.

Light emitted from a semiconductor laser (light source) 119 is reflected by a half mirror 120 and focused by an objective lens 121 on a recording surface 122 of the recording medium shown in FIG. 7 or 8. Light reflected by the recording surface 122 passes through the objective lens 121 and the half mirror 120 again and is focused on an incident end face of a double mode waveguide 124 formed on a substrate 123. Light propagating through the double mode waveguide 124 is intensity-distributed into two channel waveguides 126 and 127 at a Y-shaped portion 125. The split light components are incident on photodetectors 128 and 129 connected at the terminal ends of the channel waveguides 126 and 127, respectively.

Output signals (electrical signals) from the photodetectors 128 and 129 are converted into a difference signal output 132 and a sum signal output 133 by a subtracter 130 and an adder 131, respectively. At this time, a length L of the double mode waveguide 124 is given as $L=L_c(2m+1)/2$ ($m=0, 1, 2, \ldots$) where $L_c$ is the perfect coupling length.

In this state, when the recording surface 122 of the recording medium is scanned in an information recording direction, a differential signal of the phase modulation signal of the recording surface 122 and an amplitude modulation signal of the recording surface 122 are independently obtained from the difference signal output 132 and the sum signal output 133, respectively.

Figure 10:
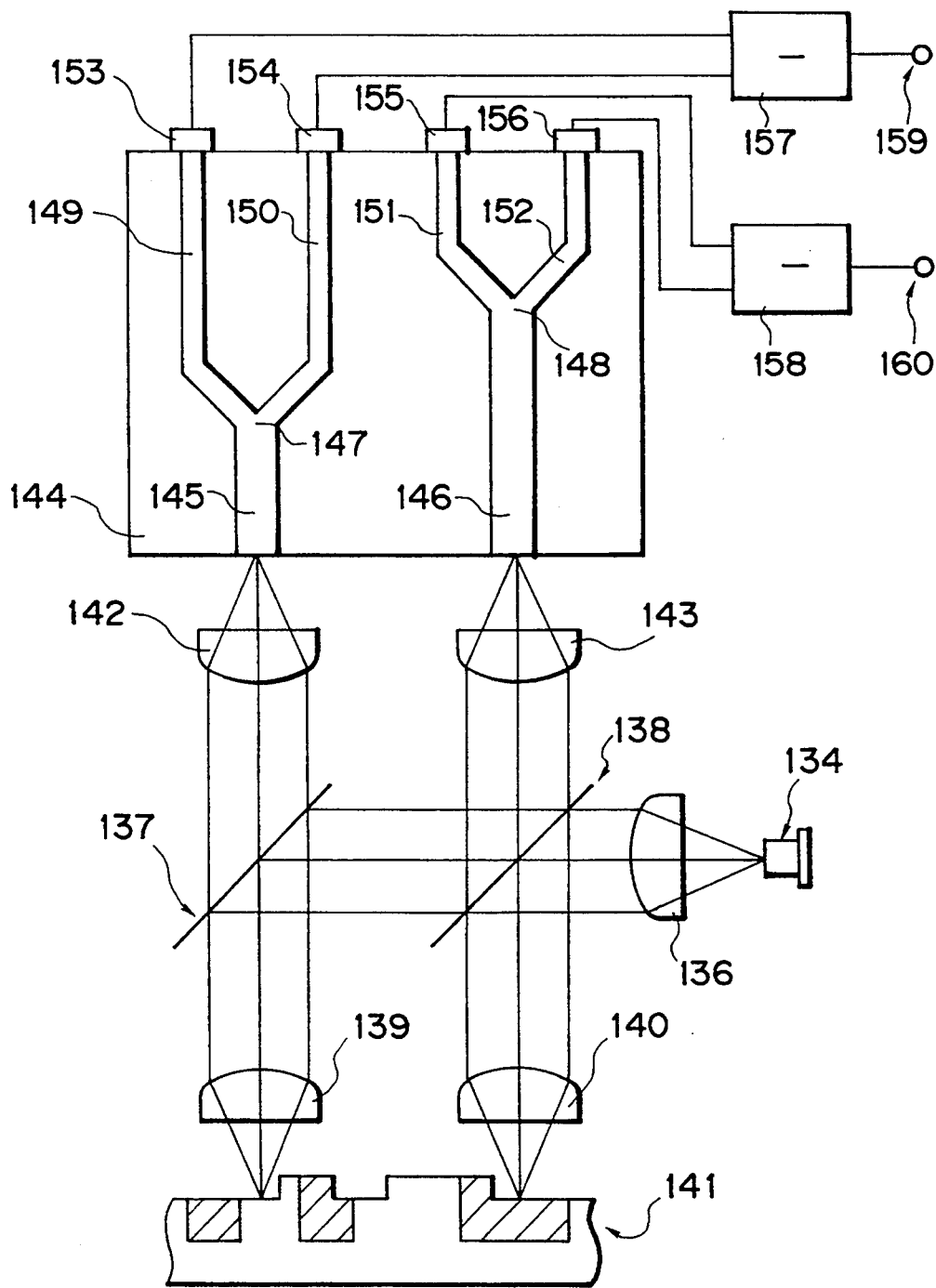
FIG. 10 is a schematic view showing an optical recording/reproducing apparatus according to the fifth embodiment of the present invention.

FIG. 10 is a schematic view showing the arrangement of an optical recording/reproducing apparatus according to the fifth embodiment of the present invention.

Light emitted from a semiconductor laser (light source) 134 is collimated into parallel light through a collimator lens 136, and part of the parallel light is reflected by half mirrors 137 and 138, so that the parallel light is split into two light beams. These two light beams are focused by objective lenses 139 and 140 on a recording surface 141 of the recording medium shown in FIG. 7 or 8.

Light beams reflected by the recording surface 141 respectively pass through the objective lenses 139 and 140 and the half mirrors 137 and 138 and are focused on incident end faces of double mode waveguides 145 and 146 formed on a substrate 144 through second objective lenses 142 and 143. The light beams propagating through the double mode waveguides 145 and 146 are intensity-distributed into two channel waveguides 149 and 150 and two channel waveguides 151 and 152 by Y-shaped portions 147 and 148. The split light beams are incident on two photodetectors 153 and 154 and photodetectors 155 and 156 which connected to the exit surfaces of the channel waveguides, respectively. The incident intensity-modulated light beams (information) are converted into electrical signals by the photodetectors 153 and 154 and the photodetectors 155 and 156 respectively. Output signals (electrical signals) from the photodetectors are converted into difference signal outputs 159 and 160 by subtracters 157 and 158, respectively. At this time, lengths L145 and L146 of the double mode waveguides 145 and 146 are defined as follows:

$$L145 = L_c(2m+1)/2 \ (m=0, 1, 2, \ldots)$$

$$L146 = mL_c \ (m=1, 2, \ldots)$$

where $L_c$ is the perfect coupling length.

In this state, when the recording surface 141 of the recording medium is scanned in an information recording direction, a differential signal of the phase modulation signal of the recording surface 141 and a differential signal of the amplitude modulation signal of the recording surface 141 are independently and separately obtained from the difference signals 159 and 160 respectively.

In this embodiment, to independently and separately read the phase modulation information and the amplitude modulation information, a waveguide device formed on a substrate is used. However, any other means having an identical function may be used.

In this embodiment, various pieces of recording information are read by scanning an information recording medium. However, read light may be scanned while a recording medium is kept stationary, or read light and a recording medium may be scanned relative to each other to obtain the same effect as described above.

In the description of an optical recording/reproducing apparatus of each embodiment described above, illustration of focusing and tracking servo means required in the reproduction mode was omitted. Various methods as in a conventional method can be used as focusing servo methods. A three-beam tracking servo method may be used.

What is claimed is:

1. A method of performing high-density reproduction of information recorded on an optical recording medium, including:

a step of radiating read light on said optical recording medium in which first information for modulating a phase of the read light and second information for modulating an amplitude of the read light are recorded as physical variations of the optical recording medium;

a step of receiving read light reflected by or transmitted through said optical recording medium;

a detection step of independently detecting phase modulation information and amplitude modulation information of said optical recording medium using the received light; and a step of reproducing the first information and the second information from the information in the detection step.

2. A method according to claim 1, wherein a height of a pit corresponding to the first information is different from a height of a pit corresponding to the second information, and the pits having different heights are arranged parallel to each other on the recording medium.

3. A method according to claim 2, wherein the height of the pit corresponding to the first information is smaller than the height of the pit corresponding to the second information on the recording medium.

4. A method according to claim 1, wherein a depth of a pit corresponding to the first information is different from a depth of a pit corresponding to the second information, and the pits having different depths are arranged parallel to each other on the recording medium.

5. A method according to claim 4, wherein the depth of the pit corresponding to the first information is smaller than the depth of the pit corresponding to the second information on the recording medium.

6. A method according to claim 1, wherein the pit corresponding to the first information is recorded by a recess or projection, and the pit corresponding to the second information is recorded by a difference in reflectance.

7. An apparatus for performing high-density reproduction of information recorded on an optical recording medium, including:

read light radiating means for radiating read light on said optical recording medium in which first information for modulating a phase of the read light and second information for modulating an amplitude of the read light are recorded as physical variations of the optical recording medium;

modulation detecting means for independently detecting phase modulation information and amplitude modulation information of said optical recording medium using modulated read light reflected by or transmitted through said optical recording medium; and information output means for reproducing the first information and the second information from the information from said modulation detecting means.

8. An apparatus according to claim 7, wherein a height of a pit corresponding to the first information is different from a height of a pit corresponding to the second information, and the pits having different heights are arranged parallel to each other on the recording medium.

9. An apparatus according to claim 7, wherein a depth of a pit corresponding to the first information is different from a depth of a pit corresponding to the second information, and the pits having different depths are arranged parallel to each other on the recording medium.

10. An apparatus according to claim 7, wherein the pit corresponding to the first information is recorded by a recess or projection, and the pit corresponding to the second information is recorded by a difference in reflectance.

11. An apparatus according to claim 7, wherein said optical recording medium has a first projecting or recessed pit corresponding to the first information and having a height or depth smaller than an optical path length of $\lambda/8$ with respect to a reference surface, and a second projecting or recessed pit corresponding to the second information and having a height or depth corresponding to an optical path length of about $\lambda/4$ with respect to said reference surface.

12. An apparatus according to claim 11, wherein a width of said second projecting or recessed pit on said optical recording medium is not more than $\frac{1}{3}$ a focused spot size ($e^{-2}$ full width) of the read light from said read light radiating means.

13. An apparatus according to claim 7, wherein said modulation detecting means comprises a channel waveguide device and a photodetector for detecting light having passed through said waveguide device.

14. An apparatus according to claim 13, wherein said waveguide channel device comprises an incident-side double mode waveguide portion, two exit-side waveguide portions, and a Y-shaped portion for coupling said waveguide portions, said waveguide channel device having an incident end located at a focal position at which light reflected by said recording medium is focused again, and said photodetector detects light emerging from said two exit-side waveguide portions through said Y-shaped portion.

15. An apparatus according to claim 14, wherein said photodetector of said modulation detecting means outputs signals obtained by respectively photoelectrically converting exit light components from said two exit-side waveguide portions, and said modulation detecting means comprises differential means for outputting a differential output of the photoelectrically converted signals as an optically recorded/reproduced signal.

16. An apparatus according to claim 15, wherein a waveguide substrate of said waveguide channel device has an electrooptical effect and an electrode structure in said double mode waveguide portion, and said waveguide channel device comprises control means for controlling a voltage applied across said electrode structure to change equivalent refractive indices of two waveguide modes excited in said double mode waveguide portion.

17. An apparatus according to claim 16, wherein said waveguide channel device further comprises a third waveguide portion between the two exit-side waveguide portions, said third waveguide portion, said two exit-side waveguide portions, and said double mode waveguide portions being coupled to each other at a connecting portion, so that a laser beam for radiating said recording medium is incident from an end face of said third waveguide portion and emerges from an end face of said double mode waveguide portion.

18. An optical recording medium for reproduction of high-density information, comprising:
a substrate;
first information for modulating a phase of read light radiated on said substrate; and
second information for modulating an amplitude of the read light radiated on said substrate,
wherein the first information and the second information are physical variations of the recording medium arranged in parallel to each other on said substrate in a predetermined arrangement direction.

19. A medium according to claim 18, wherein said optical recording medium has a first pit array corresponding to the first information and a second pit array corresponding to the second information, so that an optical path difference of said first pit corresponding to the first information with respect to a reference surface is smaller than $\lambda/8$, and an optical path difference of said second pit corresponding to the second information is about $\lambda/4$ with respect to said reference surface of said medium.

20. A medium according to claim 19, wherein a width of said second pit is not more than $\frac{1}{3}$ a focusing spot size ($e^{-2}$ full width) of the read light.

* * * * *